UNITED STATES PATENT OFFICE.

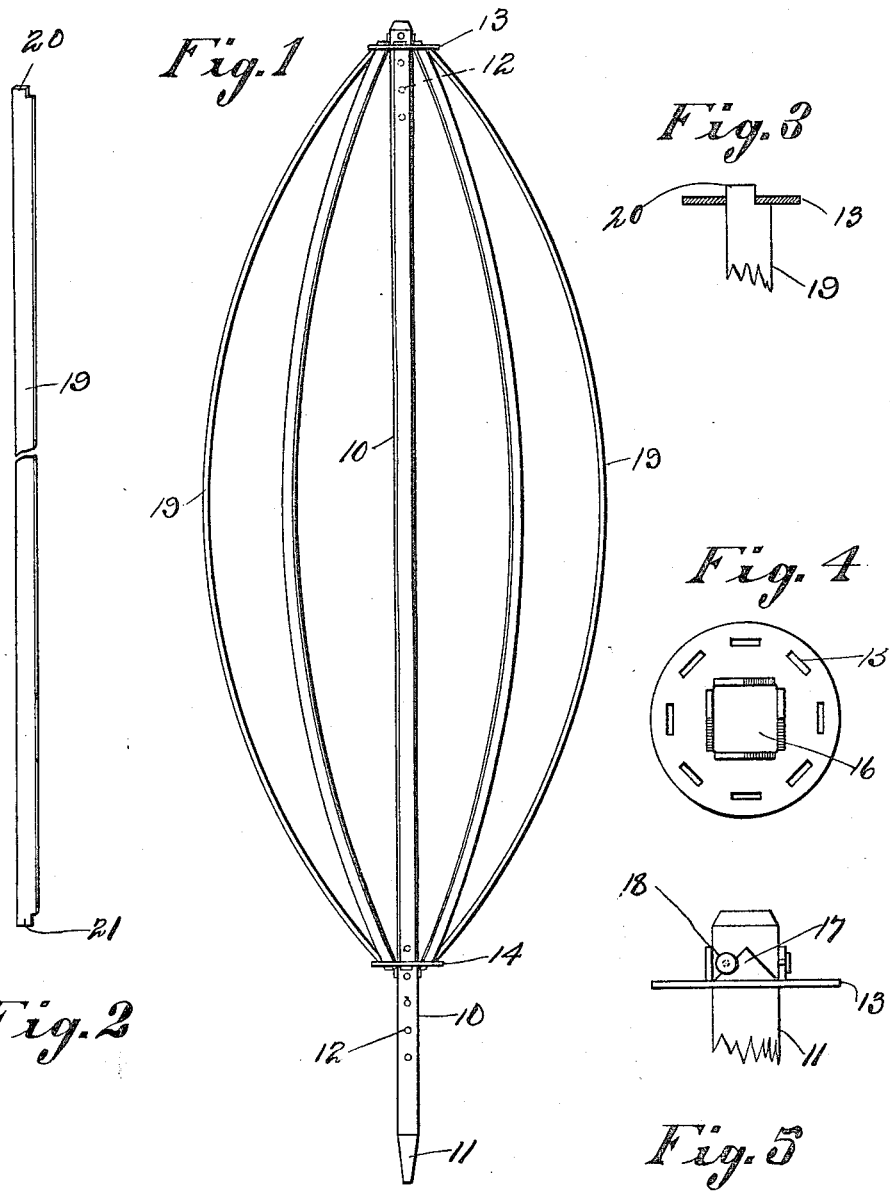

GEORGE C. SETCHELL, OF CRANSTON, RHODE ISLAND.

TRELLIS.

1,127,530.  Specification of Letters Patent.  Patented Feb. 9, 1915.

Application filed May 2, 1914. Serial No. 836,000.

*To all whom it may concern:*

Be it known that I, GEORGE C. SETCHELL, citizen of the United States, and resident of the city of Cranston, in the county of Providence and State of Rhode Island, have invented certain new and useful Improvements in Trellises, of which the following is a specification.

This invention relates to a ballooned trellis for plants and has for its object to provide a trellis or support for plants, flowers or vines that is constructed of a central shaft having spaced apart plates or collars mounted thereon and a plurality of resilient ribs or slats adapted to be bent or bowed with their ends engaging the collars whereby the ribs are held in position and in contact with the collars by their inherent spring tension.

A further object of the invention is the provision of means whereby the collars may be adjusted longitudinally on the said shaft to determine the extent of bending, bowing or ballooning of the ribs that are held between them.

With these and other objects in view, the invention consists of certain novel features of construction, as will be more fully described and particularly pointed out in the appended claims.

In the accompanying drawings: Figure 1— is a side elevation showing the central shaft and a pair of spaced apart collars supported on the shaft, and a plurality of resilient ribs bent in a bowform and held under tension between the collars. Fig. 2— is a detail in perspective showing one of the resilient ribs or slats. Fig. 3— is an enlarged view illustrating the reduced end of one of the ribs for engaging the aperture in its collar. Fig. 4— is a plan view of one of the collars showing a plurality of rib-end receiving apertures, and the stock of the center portion as having been punched outwardly providing an aperture for receiving the central shaft. Fig. 5— is a view showing one of the collars as applied to the shaft.

Referring to the drawing, 10 designates the central shaft of the trellis, which may be constructed of any suitable material, but I preferably construct the same of wood and point or sharpen the lower end 11 so that it may be more readily forced into the ground in the vicinity of the plant or vine the trellis is to support. I have also provided a plurality of small holes 12 through this central shaft near its upper and lower ends through which a pin may be passed for the purpose of supporting and determining the position of the two collars 13 and 14. These collars are preferably formed of metal cut in the shape of thin disks each having a plurality of apertures or openings 15 punched therein near its periphery. The stock at the center portion of each disk is punched out forming an aperture 16 to correspond with that of the central shaft and adapted to fit snugly thereon, the stock about the aperture being raised to form lips 17, best shown in Fig. 5, so as to form a bearing for the collar to better support it in position on the shaft. In order to support these collars in the desired position upon the shaft I have provided a short pin to pass through any of the holes 12 in the shaft one below the lower collar and one above the upper collar, or in some cases it is only necessary to drive a tack as at 18; see Fig. 5, into the wood with its head overlapping the flange 17, which will retain the collar on the shaft.

In order to provide a novel and attractive shape of trellis for supporting the vines, I have provided a plurality of slats or ribs 19 formed thin so that they may be bent or bowed as illustrated in Fig. 1, and I have reduced their ends 20 and 21 forming tenons thereon, which are adapted to enter and be retained in the apertures 15 in the upper and lower collars. By this construction it will be seen that the bowing of the ribs causes the inherent spring in the stock to force and firmly retain the ends of the ribs in the apertures in the collars. Another advantage in this construction is that the bowing of the ribs provides a ballooning effect of the trellis, which is new and gives to the supported plants and vines a handsome and attractive appearance.

Another feature of my improved construction is that the slats or ribs and also the supporting collars may be readily removed, the whole to occupy a very small space to facilitate transportation. The extent of the ballooning may be varied to suit the taste of the individual user by simply adjusting either one or both of the collars lengthwise of the central shaft by inserting either one or both of the retaining pins in another hole.

I claim:

1. A trellis comprising a central supporting shaft, a pair of spaced apart collars supported on said shaft, each having a plurality of apertures therein, and a plurality of resilient bowed ribs having their opposite ends engaging said apertures and held therein by the inherent spring of the stock.

2. A trellis comprising a central supporting shaft, a pair of spaced apart collars supported on said shaft each having a plurality of apertures therein, a plurality of resilient bowed ribs having their opposite ends engaging said apertures and held therein by the inherent spring of the stock, and means whereby one or both of said collars may be adjusted longitudinally on said shaft to determine the extent of bow or bend of said rib.

3. A trellis comprising a central supporting shaft, a pair of spaced apart collars supported on said shaft, each having a plurality of apertures therein, a plurality of resilient ribs having their opposite ends reduced to engage and be retained in said apertures under pressure of the inherent spring of the stock.

4. A trellis comprising a central supporting shaft, a pair of spaced apart collars supported on said shaft, each having a plurality of apertures therein, a plurality of resilient ribs having their opposite ends reduced to engage and be retained in said apertures under spring pressure, and means whereby one or both said collars may be adjusted longitudinally on said shaft to determine the extent of bow or bend of said rib.

In testimony whereof I affix my signature in presence of two witnesses.

GEORGE C. SETCHELL.

Witnesses:
CHARLES L. DAVIS,
HOWARD E. BARLOW.

Copies of this patent may be obtained for five cents each, by addressing the "Commissioner of Patents, Washington, D. C."